July 30, 1929.  C. A. THISTLETHWAITE  1,722,446
CASH REGISTER
Filed April 10, 1923   5 Sheets-Sheet 1

CHARLES. A. THISTLETHWAITE
INVENTOR

July 30, 1929.  C. A. THISTLETHWAITE  1,722,446
CASH REGISTER
Filed April 10, 1923   5 Sheets-Sheet 2

WITNESS.
Albert S. Hayes.

CHARLES. A. THISTLETHWAITE
INVENTOR

BY
A. A. Hicke
ATTORNEY

July 30, 1929.  C. A. THISTLETHWAITE  1,722,446
CASH REGISTER
Filed April 10, 1923   5 Sheets-Sheet 3

WITNESS.
Albert S. Hayes.

CHAS. A. THISTLETHWAITE
INVENTOR

BY
ATTORNEY

July 30, 1929.　　C. A. THISTLETHWAITE　　1,722,446
CASH REGISTER
Filed April 10, 1923　　5 Sheets-Sheet 4

CHARLES. A. THISTLETHWAITE
INVENTOR.

Patented July 30, 1929.

1,722,446

UNITED STATES PATENT OFFICE.

CHARLES A. THISTLETHWAITE, OF ILION, NEW YORK, ASSIGNOR TO REMINGTON ARMS COMPANY, INC., A CORPORATION OF DELAWARE.

CASH REGISTER.

Application filed April 10, 1923. Serial No. 631,223.

This invention relates generally to cash registers and has particular reference to improvements in printing mechanisms for such machines.

The cash register shown and described in the present application is of the key operated type, that is, the various functions usually performed by machines of this type, such as registering, indicating and recording the transactions entered, are directly effected and controlled by the operated keys. The keys are arranged in groups or banks one or more banks being provided for the amount or value keys, a bank for the "color" or transaction keys, the purpose of which is to designate the type of transaction entered into the machine, and a special bank of keys known as the "clerks" keys. The latter keys have various functions such as releasing the amount and transaction keys for depression, actuating the totalizer engaging mechanism, setting a special type carrier and elevating to exposed position a special indicator which identifies the clerk operating the machine.

The illustrative machine is further provided with multiple totalizers, one for each clerk's key, for registering the items entered in the machine. If desired the totalizers and associated keys may be appropriated to different departments or for registering cash and credit transactions, or, in general, may be used to make any segregated analysis or classification of transactions.

The recording mechanism utilized in this type of machine comprises a plurality of type carriers under control of the operated keys. Operation of the various keys will adjust the type carriers to bring to the printing line suitable type which will designate the amount, type of transaction and also print upon the record strip a characteristic symbol for identifying the special key operated. Means are further provided for printing upon the record strip the total standing upon the totalizers accumulated during a particular period, but this mechanism is not involved in the present application and is only briefly mentioned herein.

It is frequently very desirable to make more extended entries upon the record strip than that permitted by the available printing mechanism, and in the attainment of this end, registers are usually provided with the so-called autographic attachment. Such an attachment generally comprises a record strip of a suitable width so that written entries or notations may be made in juxtaposition to the printed amounts and characters. Such a device is especially useful in connection with the entering of special transactions such as, for example, "received-on-account" transactions, where it is frequently desirable to enter the name of the customer alongside of the printed amount so that the person will be properly credited with the amount by the auditing or bookkeeping force. It can, of course, be used in conjunction with "cash" transactions and when used in this connection, the article sold, as well as the stock number and other suitable identifying notations may be entered beside the printed amount. Such a device has a wide scope and variety of uses and the manner and method in which it is utilized will generally depend upon the nature of the business, the system in force and the amount of information required by the proprietor. The details of the foregoing construction and operation are not herein set forth, and for a full disclosure reference may be had to the pending applications, Ser. No. 263,125, filed Nov. 19, 1918, and Ser. No. 283,720, filed Mar. 20, 1919, of Frederick L. Fuller as well as in the British Patents 135,465; 140,363; 157,823; 157,824; 157,825 of July 11, 1921.

With the above brief description of the illustrative embodiment the objects of the present invention will now be stated.

A broad object of the present invention is to provide an improved mechanism requiring little expenditure of power for automatically feeding a record strip during a regular operation of the machine, from a printing position to a position where written entries may be made adjacent to the printed items, with provision of suitable manipulative means for effecting an additional feed of the record strip at will.

Another object of the invention is to provide an improved construction for mounting the storage roll on a frame movable independently of the main supporting frame for the printing mechanism so that the storage roll frame may be elevated to facilitate the removal of the printed record strip or the insertion of a new supply roll, and the provision of suitable mechanism for insuring the alignment of co-operating parts when the storage frame is lowered to its normal position.

Another object of the present invention is to prevent withdrawal of the storage frame from its normal position while the machine is being operated, and if the operating keys should inadvertently be partially depressed while the storage frame is elevated, to prevent the restoring of the frame to its normal position until a complete operation of the keys has been effected.

Another object of the present invention is to provide suitable mechanism for mounting the impression blocks utilized for effecting printing impressions from the type carriers in suitable holders so that they may be easily replaced when worn out as a result of constant use.

While in the accompanying drawings the improvements are shown in one form which they might take when applied to or embodied in machines of the key operated type shown and described in the applications of Frederick L. Fuller previously mentioned and application Serial No. 584,722 filed Aug. 28, 1922 by Raymond E. Rice, this embodiment is illustrative only as the improvements are capable of modification and change to permit applying them to machines of other types and it is the desire not to be limited to the form of embodiment herein shown and described.

With these and incidental objects in view, the invention consists in certain novel features of construction and combination of parts, a preferred form of embodiment of which is hereinafter described with reference to the drawings which accompany and form part of the specification.

Described in general terms the illustrative machine comprises a series of manipulative devices such as keys 20 (Fig. 1) operable to actuate totalizing mechanism and mechanism for entering the items on a record strip.

The keys 20 are pivoted upon a rod 21 and resting upon the rear ends of the keys is a key coupler 22 pivoted at 23. When the outer ends of the keys are depressed the coupler is rocked clockwise about its pivot and its nose 24 enters the notch 25 in the rear ends of the keys. The construction and purpose of key coupler mechanism are well known in the art and need not be discussed herein.

Each key 20 is formed with an upwardly extending arm 26 carrying a stud 27 engaging a slot 28 in one of a series of plates 29 rigidly mounted in a frame 30 loosely mounted on the shaft 31. The slots 28 in plates 29 are graduated so that each of the keys will impart a differential movement to the frame 30. Secured to the frame 30 is a segmental rack 301. It is to be understood that the keys 20 are arranged in banks and that for each bank there is a differentially actuated frame 30 and its corresponding segment rack. Each segment meshes with a pinion rigid with its corresponding item type wheel 32 and sets up a number which corresponds to the value of the key depressed.

Pivotally mounted below the item type carrier 32 and engaging the segmental rack hereinbefore mentioned are two totalizers mounted on the shafts 33 and 34 and designated as totalizers "A" and "B" in Fig. 1 of the drawings. These may be utilized for the purpose of registering amounts for separate departments or clerks and they have manipulative means associated therewith in order that either totalizer may be operated to register amounts of the various transactions. The totalizer engaging mechanism is not directly involved in the present invention and is not shown or described in this application, and for a detailed description thereof reference may be had to the Fuller applications above mentioned.

Connected to the key coupler is a double rack 341, the connection being such that as the coupler is rocked by the keys the rack is raised and lowered, and drives a shaft 35 in such a manner that a complete reciprocation of the coupler will effect a complete rotation of the shaft. The shaft 35 carries cams and other devices for operating various parts of the mechanism. The mechanism for effecting rotation of the shaft has not been shown or described in detail because it is old and well known in the art.

Referring now more particularly to the printing mechanism of the illustrative machine whereby the items of the various transactions are printed upon a record strip, the entire impression making and paper feeding mechanism is supported by side plates 40 and 41 (Fig. 2) connected by rods and a cross bar to form a unit. Both side plates are provided with claws 42 and 43 (Figs. 1, 3 and 4) pivotally engaging the shaft 31 hereinbefore mentioned. Normally the printing mechanism rests in a rearward position with lugs 44 formed on the rear end of each side plate resting against the cross frame 36. Due to the fact that the preponderance of weight of the printing mechanism is to the rear of the supporting shaft 31, the entire frame tends to remain in this rear position.

The printing mechanism is so constructed that it may be rocked forwardly to print upon the record strip the total standing upon either totalizer. To accomplish this the printing mechanism is provided with manipulative devices 200 and 201 shown best in Fig. 3. By grasping the manipulative device 200 and pulling the same forwardly the printing frame will be rocked until the platen overlies the totalizer "A" whereupon the platen will be operated to take an impression from the totalizer elements. In order to print the total standing upon the totalizer "B" the operation is similar to that just described except that the manipulative device 201 is grasped allowing the printing mechanism to be rocked still further forwardly and downwardly until the platen overlies the totalizer "B". For further details of construction and operation of this total printing arrangement reference may be had to the Fuller application S. N. 263,125 above cited.

Figure 2:
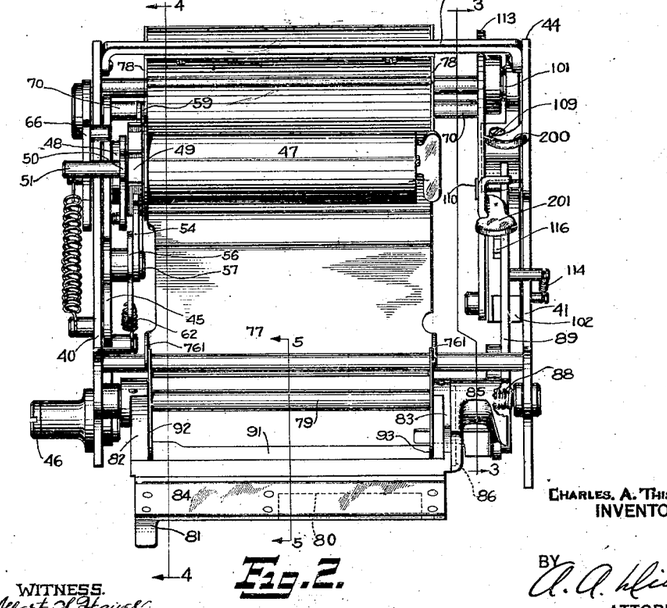
Fig. 2 is a top plan view of the printing mechanism showing the platen and associated mechanism.
Figures 9, 10:
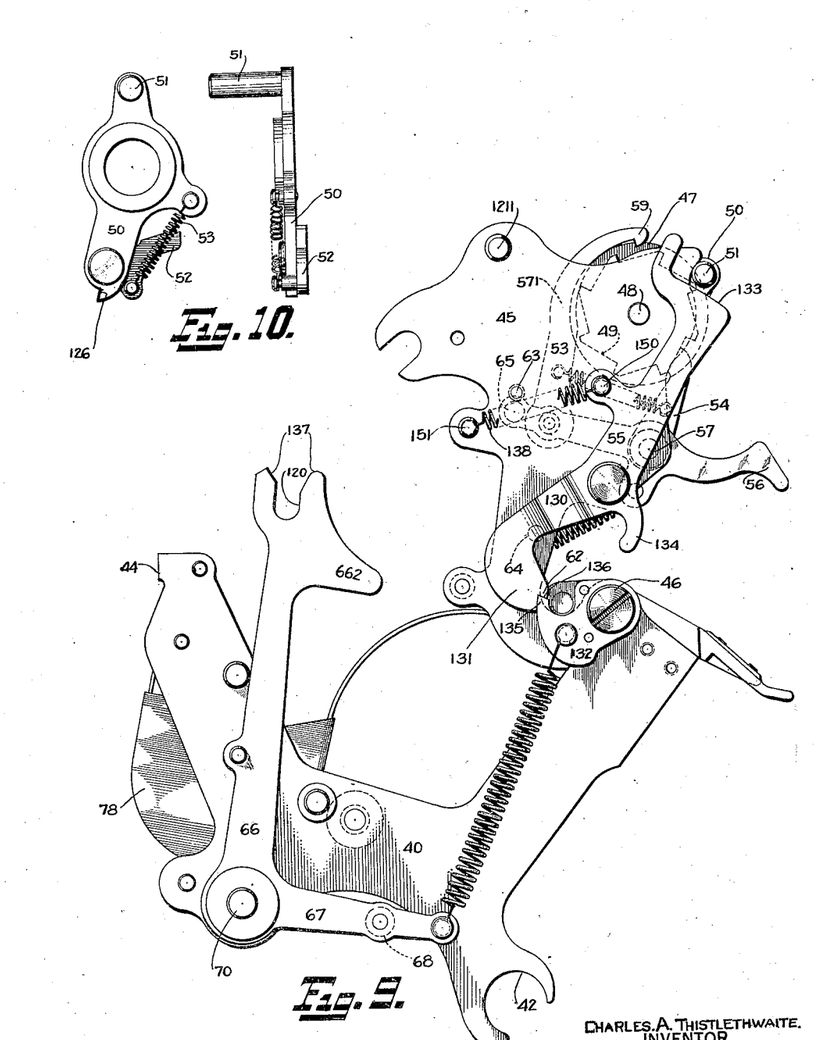
Fig. 9 is a view like Fig. 8 with the frame which carries the storage roll in its elevated position and shows the operation of the drivers for holding it in that position and locking the storage roll feed.
Fig. 10 shows two views of the operating arm and pawl for feeding the storage roll during the operation of the machine.

The paper storage roll and associated mechanism is mounted on a plate 45 (Figs. 2 and 4) pivoted at 46 to the side plate 40 in order that it may be rotated around this pivot when it is necessary to remove the paper from the storage roll or to replenish the paper supply. The storage roll (shown at 47) is journalled on a shaft 48 secured to the plate 45 and is provided with a ratchet wheel 49 (Figs. 2 and 9). Rotatably mounted upon the shaft 48 between the ratchet wheel 49 and frame 45 is an operating arm 50 best seen in Figs. 4 and 10, carrying a stud 51 at its upper end and at its lower end a pivoted spring pressed feeding pawl 52 engaging the teeth of the ratchet wheel 49. A spring 53 (Fig. 10) tends to retain the engaging end of the feeding pawl 52 in engagement with the teeth of the ratchet wheel 49. In order to prevent retrograde movement of the storage roll there is provided a retaining pawl 54 (Fig. 4) pivoted to the plate 45 at 57 and held in engagement with the ratchet wheel 49 by a spring 55.

The storage roll operating arm 50 is given an oscillating movement during each operation of the machine, by means hereinafter to be described, and it will be evident that when the operating arm 50 is rocked (counter-clockwise as viewed in Fig. 4) the storage roll will be held stationary by the retaining pawl 54 and the feeding pawl 52 will be moved to engage the next tooth of the ratchet wheel, and that on the return movement the feeding pawl 52 will rotate the ratchet wheel and storage roll one step forward. By this means the items which have been printed upon the record strip will be spaced apart at regular intervals.

It is frequently desirable to feed the paper a greater amount than that effected during a regular operation of the machine, and to this end the following mechanism is provided. A manipulative lever 56 (Fig. 4) is pivoted upon the same stud 57 as the retaining pawl 54 and at its lower end is connected to a feeding pawl 571. The spring 55 previously mentioned is connected to the pawl 571 and normally tends to force the curved edge 58 of the pawl against the teeth of the ratchet wheel 49 with a hook 59 on the pawl out of the path of the ratchet teeth on the storage roll. A bent over lug 60 formed at the lower end of the manipulative lever 56 engages with the sides of an aperture 61 formed in the plate 45 and limits the reciprocating movement of the lever 56. A spring 62 is provided to return the lever 56 to its normal position when it has been operated. Figure 9 illustrates a modification of a means which may be utilized for limiting the reciprocating movements of the lever 56. Two studs 63 and 64 are secured to the plate 45 and are in the path of a stud 65 carried by the lower end of the lever 56 to thereby limit the reciprocating movement of the same.

From the foregoing it is evident that each time the lever 56 is moved rearwardly the hook 59 of the pawl 571 thereon will engage one of the ratchet teeth and rotate the storage roll one step.

The means for rocking the storage roll operating arm 50 will now be described. Journalled in the plates 40 and 41 of the printing mechanism is an operating shaft 70, (Fig. 1). Fast to the shaft 70 is a bell crank lever 66. The vertical arm of the bell crank lever is provided with a notch 120 at its upper end to receive the stud 51 which, as has been previously stated, is secured to the operating arm 50. A horizontal arm 67 of the bell-crank lever carries a roller 68 which co-acts with a box cam 69 (Fig. 1) fast to the shaft 35. As has been mentioned heretofore, the shaft 35 is given a complete rotation at each operation of the machine and rotation of the cam 69 will therefore rock shaft 70, and, thru the vertical arm of the bell-crank lever 66, will rock the operating arm 50 and pawl 52 to rotate the storage roll 47.

Extending transversely between the side plates 40 and 41 is a U shaped receptacle 72 (Fig. 4) in which is loosely placed the supply paper roll (represented by the broken line 73). The back of the receptacle 72 is extended upwardly as at 74 and is secured to a cross member 75, which is rigidly connected at its ends to the printer side plates 40 and 41. The front of the receptacle 72 is also extended upwardly to form a paper guide plate 76 and is provided with fingers 761 (Fig. 4) engaging over a transverse shaft 77 extending between the side plates 40 and 41. Lateral movement of the paper roll is prevented by the end plates 78 (Figs. 2, 8, and 9) forming parts of the receptacle 72.

In order to keep the record strip under tension at all times so that the paper will not be wound too loosely around the storage roll the following mechanism is employed. Supported in the end plates 78 of the supply roll receptacle 72 are two shafts 1500 and 1510 (Fig. 4) surrounding which are two rollers 153 and 154 extending the length of the receptacle. These rollers are located a short distance from the base of the receptacle and are separated preferably a distance less than the diameter of a new roll of paper. The supply roll is placed upon these rollers and as the storage roll is rotated to feed the strip the rollers rotate freely. As the paper is drawn upward by the feeding mechanism the supply roll is rotated and the combined effect of the weight of the supply roll upon the rollers and the resistance against rotation offered by the supply roll tends to keep a tension upon the record strip at all times. As the diameter of the roll diminishes the supply roll will drop between the rollers and the periphery of the roll of paper will now contact with the base of the receptacle, thus offering still more resistance against rotation supplying that which has been lost due to the diminishing of the weight of the supply roll. However, the roller 154 will still contact with the periphery of the roll at the point where the paper strip leaves the supply roll and thereby aid in giving the proper tension to the paper strip. This tension mechanism is not a part of the present applicant's invention, and, while it is shown and described in detail, no claims to it are made in this case.

Figure 4:
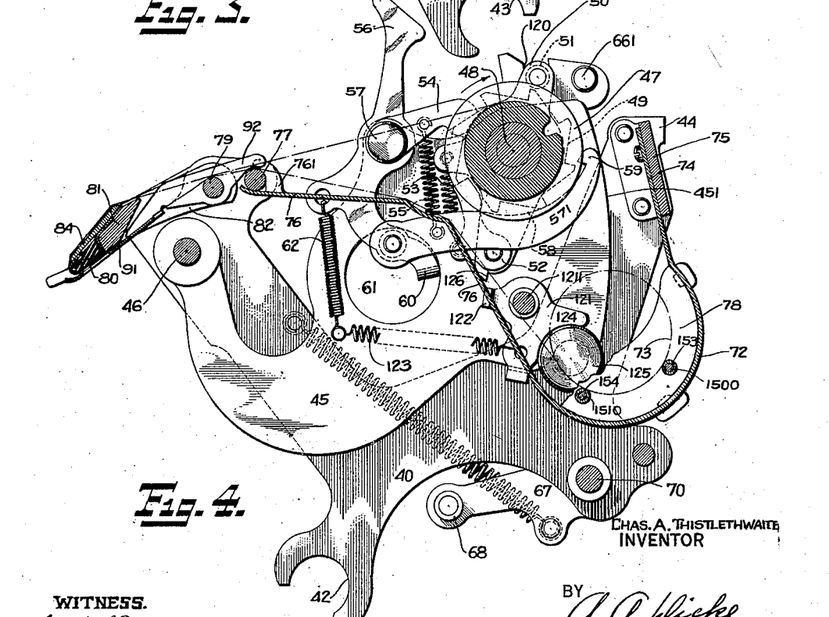
Fig. 4 is a section taken on the line 4—4 of Fig. 2 and shows the receptacle for holding the paper supply roll, the feeding mechanism for the storage roll and the means for insuring alignment of co-operating parts when the storage roll frame is lowered.

As shown in broken lines in Fig. 4, the paper strip is led from the supply roll 73 under a rod 1211 secured to the plate 45 over the guide plate 76, over the shaft 77, over a platen supporting shaft 79, under an impression block 80, over a writing table 84 and thence to the storage roll 47.

The shaft 79, just mentioned, extends transversely between the printer side plates 40 and 41 and supports a cross bar or support 81 by means of arms 82 and 83 (see Figs. 2 and 6) which are secured to the said shaft. The bar 81 has secured to its upper face a plate (Fig. 4) for providing the writing surface 84 upon which notations may be made and for retaining the removable impression block 80 in position, as will be later described.

Figure 5:
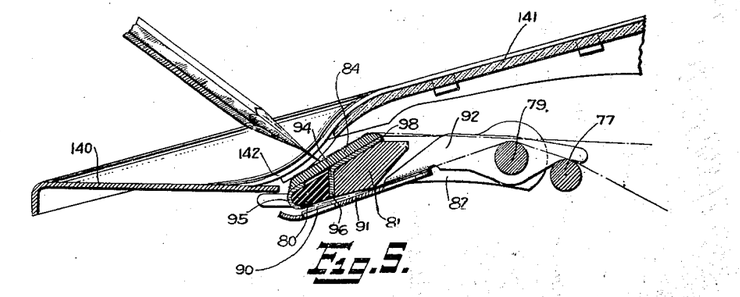
Fig. 5 is an enlarged sectional view taken on the line 5—5 of Fig. 2 and shows clearly the independently removable impression block.

Loosely mounted upon the platen supporting shaft 79 is a clutch element 85 (Fig. 2) provided with a channel 86 adapted to receive a rib 87 (Fig. 6) formed on the side of the platen arm 83. A spring 88 tends to force the channel 86 and the rib 87 into engagement. Secured to the clutch element 85 is an arm 89 (Figs. 2 and 3) the function of which will be described later. As a result of this construction if the operator is desirous of obtaining access to the printing wheels or the removable impression block 80, he may readily do so by sliding the clutch element 85 to the right (as viewed in Fig. 2) to disengage the channel 86 from the rib 87 so that the platen can be raised. This mechanism is briefly described in the present application and for a fuller and more complete showing reference may be had to the Rice application above cited. An inking ribbon 90 Fig. 5 is interposed between the paper strip and a plate 91 supported upon the shaft 79 by arms 92 and 93, as clearly shown in Fig. 5. The means for feeding the inking ribbon is not involved in the present invention and any suitable mechanism may be utilized, such as for example, the construction shown in the Fuller applications above cited. By means of the present construction when a paper roll has been exhausted a new roll may be easily and quickly inserted in the following manner: The spacing lever 56 is first grasped and lifted upwardly thereby raising the plate 45 which is held in its elevated position by means which will hereinafter be described. The printer mechanism is now in a position illustrated in Fig. 9 in which position the removal of the printed record strip wound upon the storage roll shaft is facilitated. Since the guide rod 1211 is carried by the plate 45 (which is now elevated) the new supply roll may be readily placed in the U shaped receptacle. A portion of the paper is unrolled passed over the guide plate 76, over the shaft 77 around the platen and thence to the storage roll shaft to which it is fastened. The plate 45 is now returned to its lower position and in so doing a portion of the paper is unrolled from the supply roll. When the plate 45 is in its normal or lowered position the rod 1211 will overlie the paper strip as best shown in Fig. 4 and will contact with the periphery of the roll to retain the same in the receptacle if the roll should for any reason tend to creep up the guide plate 76 during a paper feeding operation.

Figures 6, 7:
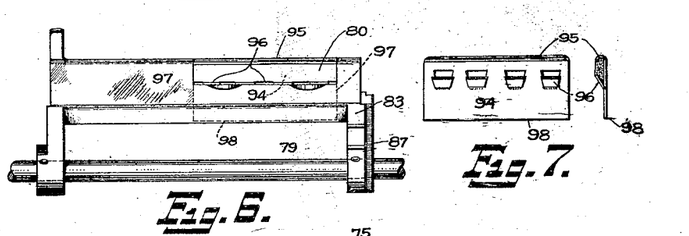
Fig. 6 is a view of the underside of the platen.
Fig. 7 shows a top and side view of the carrier plate for the impression block.

In printing mechanisms of the kind just described, it has been found that the impression blocks wear out as a result of constant use and in order that they may be conveniently replaced the following construction is employed. The impression block 80, previously mentioned, is mounted in an impression block plate or holder 94, (Figs. 5, 6, and 7). The plate 94 is formed with outwardly bent lugs 96 and a bent over flange 95. The impression block is placed between the flange 95 and the lugs 96 and pressure is then brought to bear upon the lugs with the result that the block will be effectually locked in place. The platen or support 81 is cut away in front and on top as shown at 97 (Fig. 6) to receive the impression block and its carrier 94. The portion 98 of the carrier is inserted into the cut away portion in the upper face of the support 81 and under the plate 84 as shown in Fig. 5 until the flange 95 is in alignment with and substantially forms a part of a rounded edge on the support 81.

Referring to Figs. 4 and 5 it will be seen that the upper and lower faces of the platen and the carrier converge towards the front and merge in the rounded edge of the support 81. As a result of this construction very little movement of the paper is required to bring the last item printed to a position above the writing table or plate 84 where the printed item is visible and the written entries can be made.

Figure 3:
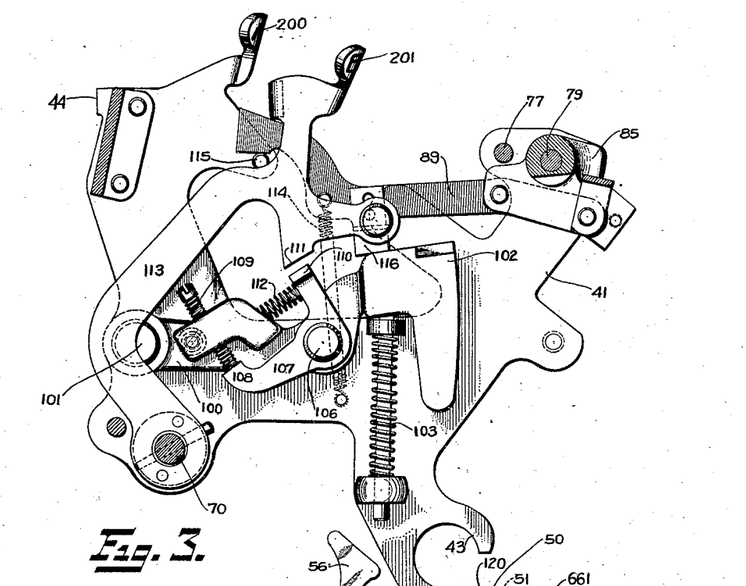
Fig. 3 is a section taken on the line 3—3 of Fig. 2 looking in the direction of the arrows and shows the means for effecting printing impressions.

The means for effecting printing impressions will now be described. The mechanism for accomplishing this is best shown in Fig. 3.

The platen bar 81 is actuated to print by a hammer comprising an arm 100 pivoted to the side frame 41 by a stud 101 and a head 102. The hammer is provided with a stud 106 upon which is mounted a hammer retracting pawl 107 having a tail 108 bearing against an adjustable stop 109 on the hammer arm 100. This pawl is provided with a bent over portion or lug 110 co-operating with the nose 111 of an arm 113. A spring 112 tends to keep the tail 108 of the pawl 107 in contact with the adjustable stop 109. The arm 113 is secured to the shaft 70 which, as before explained, is rocked at each operation of the machine.

Extending rearwardly from and connected to the platen carrying means as previously described is the arm 89 hereinbefore mentioned. The arm 89 carries a lug 116 which is actuated by the hammer 102 to force the impression block 80 against the type to take a printing impression. A spring 114 tends to draw the rear end of the arm 89 downwardly against a stud 115 carried by the printer side plate 41.

The operation of the parts just described will now be explained. When the arm 113 is rocked clockwise (Fig. 3) by means of shaft 70, the nose 111 on the arm will bear against the lug 110 of the pawl 107 and retract the hammer against the tension of a spring 103. At substantially the extreme downward stroke of the keys 20 the nose 111 will clear the lug of the pawl and permit the spring 103 to throw the hammer up against the lug 116 of the arm 89, and rock the platen downwardly to effect a printing impression from the type carriers. Upon the upward stroke of the keys 20 the pawl 52 (Figs. 4 and 10) will engage the ratchet wheel to bring the printed item over the plate 84.

It is very desirable that means be provided for insuring that the stud 51 carried by the operating arm 50 will invariably engage with the notch 120 formed in the upper end of bell crank lever 66 when the frame carrying the storage roll is lowered from its elevated position. If no means were provided to insure such alignment the stud might accidentally be rocked forward and take a position either upon the top of the bell-crank lever 66 or upon the side thereof. If an attempt is then made to operate the machine no feeding of the paper will be effected and it is quite probable that serious injury might be done to the mechanism as a result of such mis-alignment.

One form which this mechanism might take is best illustrated in Fig. 4. In this figure there is shown a pawl 121 pivoted to the storage roll frame 45, the forward end of the pawl being provided with a locking lug 122. A spring 123 connected to the lower end of the pawl tends to rotate the pawl 121 so that its tail 124 bears against a stud 125 secured to the side plate 40. The operating arm 50 is further provided with a square shoulder 126.

When the storage roll frame 45 is elevated from the position shown in Fig. 4 the tail 124 of the pawl will be freed from the stud 125 and the spring 123 will rotate the pawl so that the lug 122 will engage the square shoulder 126 and lock the arm 50 at substantially the time that the stud 51 leaves its notch 120. When the frame 45 is lowered the arm 50 will remain locked against movement until the stud 51 again enters the notch 120 whereupon the lug 122 is disengaged from the shoulder 126 to allow the rocking of the arm 50 to feed the paper as hereinbefore described.

Figure 8:
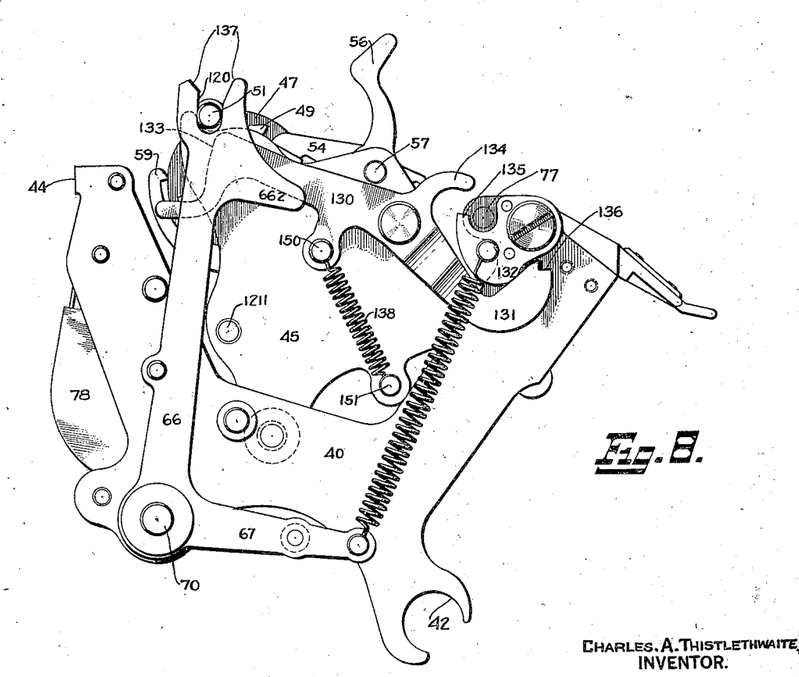
Fig. 8 is a view of one side of the printer frame showing in detail a modification of the means for insuring the alignment of the co-operating parts when the paper storage roll is lowered to normal position.

Figures 8 and 9 illustrate a modification of the mechanism which might be used to accomplish the desired results just mentioned. Pivoted to the frame 45 is an arm 130 (Fig. 8) urged downwardly by a spring 138 so that its forward end 131 bears at all times against a cam plate 132 formed on or secured to the side plate 40. The rear end of the arm 130 is further provided with a guide edge 133 and in the normal position of parts the edge 133 is below the stud 51 to allow the reciprocation of the arm 50 in the usual manner.

When the frame 45 is elevated the cam 132 forces the forward end 131 of the arm 130 downwardly against the tension of the spring 138 whereupon the guide edge 133 will pass in front of the stud 51, as shown clearly in Fig. 9, and lock the arm 50 against movement. The frame 45 is retained in its elevated position by a locking shoulder 135 formed on the cam plate 132 engaging a square shoulder 136 formed on the forward end of arm 131. When it is desired to return the frame 45 to its lower or normal position the notch 136 may be disengaged from the shoulder 135 by the pressing down on an extension 134 of the lever 130. When the frame 45 is lowered the stud 51 will be guided into the notch 120 of the bell-crank lever 66. The sides of the notch 120 are provided with bevel edges 137 to guide the stud 51 into position if the stud should happen to fall slightly to one side or the other of the notch 120.

Figure 1:
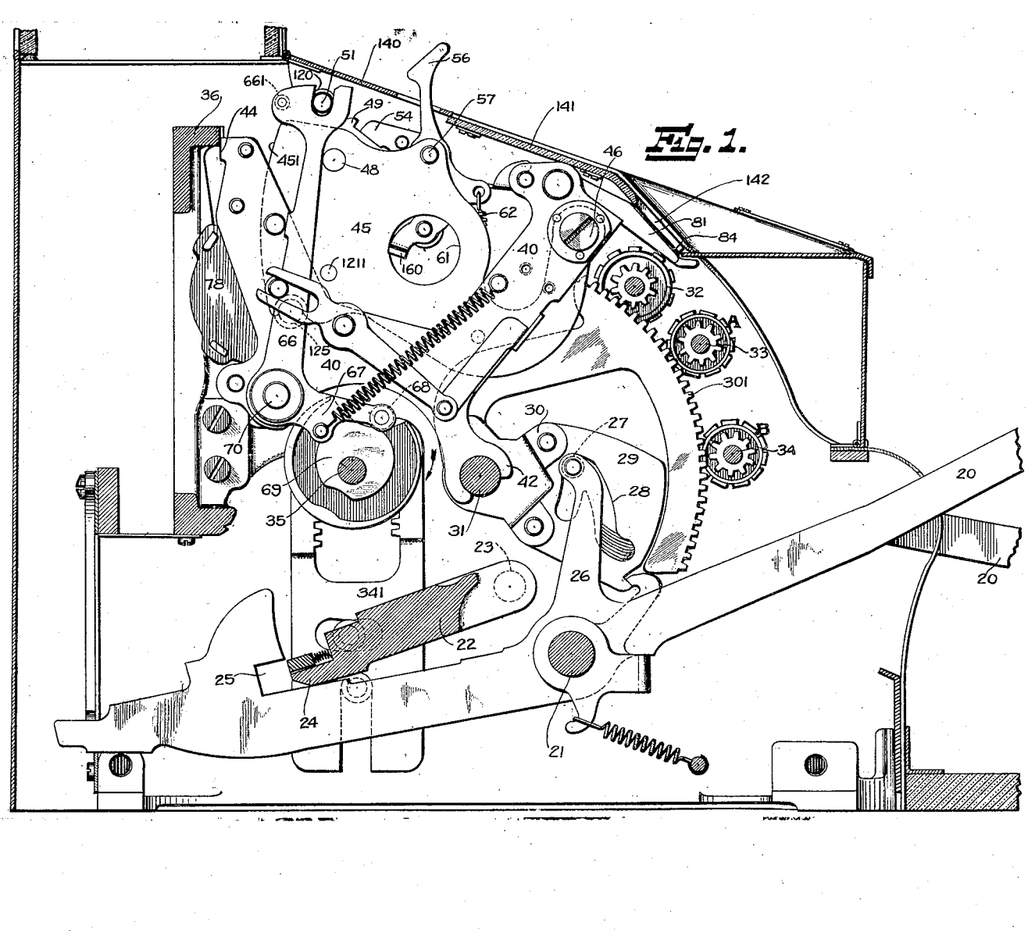
Fig. 1 is a transverse sectional view of the type of machine disclosed in the Fuller applications above mentioned with the various novel features applied thereto.

Referring to Figs. 1 and 4, it will be seen that the downward movement of the supply frame 45 is limited by the stud 125 previously referred to and means is further provided for preventing the storage roll frame from being lowered to its normal position if the bell crank 66 is moved from the normal position in which it is shown in Fig. 1. If the operator has elevated the storage roll frame 45 for any purpose whatsoever and if by accident or inadvertence he has partially depressed a key the box cam 69 will move the bell-crank 66 forwardly from the position shown in Fig. 1 and any attempt to force the frame to its normal position when the machine is in this condition might result in injury to the mechanism, particularly if an attempt were made to operate the machine in this manner. To prevent such an occurrence the bell crank 66 is equipped with a stud 661 (Figs. 1 and 4) so positioned with respect to the rearward edge 451 of the frame 45 as not to interfere with the withdrawal of the frame 45 when the bell-crank is in its normal position. If the frame is elevated and a key partially depressed and an attempt made to lower the frame 45 the stud 661 will co-operate with the lower edge of the frame 45 and prevent it from being restored to its normal position until the machine has been fully operated, whereupon the stud 661 will assume the position illustrated in Fig. 1. It will also be evident that during an item entering operation the stud 661 will overlie the upper edge of the frame 45 and prevent withdrawal of the frame until the operated keys are returned to their normal position.

In the modified printer frame shown in Fig. 8 the same results are accomplished by the following means. The bell crank 66 is provided with a forward extension 662 which is adapted to overlie a stud 150 carried by the lever 130 and movable with the frame 45 as the bell crank 66 is moved forwardly, thus preventing withdrawal of the frame 45 while the machine is being operated. Restoring of the frame 45 from its elevated to its normal position while the bell crank 66 is away from its normal position is prevented by the stud 151, carried directly by the frame 45 below the stud 150 and in the path of movement described by the stud 150, contacting with the upper edge of the extension 662.

Although not an indispensable feature, it is desirable in the preferred embodiment to combine the recording of the items upon the record strip with the autographic feature, that is, the entering of notations adjacent each printed item as a means of identifying each transaction. The record strip is of such a width that any desired notation may be entered adjacent to the printed item after the same has been entered into the machine. The printing mechanism is enclosed in a suitable casing and directly over the top of the printing mechanism is a hinged lid 140 (Fig. 5) apertured to receive a glass 141, and is further provided with writing slot 142 by means of which the notations may be made.

In describing the construction of the improved machine it has been necessary incidentally to describe the operation of the various features to such an extent that it is thought that the usual summary of the operation of the machine may be omitted.

While the embodiment herein shown and described is well adapted to fulfill the objects above stated, it is not the intention to limit the invention to the one form, as it is capable of various modifications and changes all coming within the scope of the claims which follow.

What is claimed is:

1. In a machine of the class described, the combination with printing mechanism comprising side frames, a storage roll, a storage roll frame attached to a printer side frame and movable relative thereto, manipulative devices for entering items which are to be recorded by the printing mechanism and means controlled by said manipulative devices for preventing movement of the storage roll frame.

2. In a machine of the class described, the combination with printing mechanism comprising side frames, a storage roll, a storage roll frame mounted on a printer side frame and movable relative thereto, an element carried by a printer side frame operable during an operation of the machine and means carried by the said element for preventing movement of the storage roll frame from its normal position during an operation of the machine.

3. In a machine of the class described, the combination with printing mechanism comprising side frames, a storage roll, a storage roll frame attached to a printer side frame and movable relative thereto into an elevated position, manipulative devices for entering items which are to be recorded by the printing mechanism and means for preventing restoring of the storage roll from its elevated position during an operation of the manipulative devices.

4. In a machine of the class described, the combination with printing mechanism comprising side frames, a storage roll, a storage roll frame attached to a printer side frame and movable relative thereto, into an elevated position, manipulative devices for entering items which are to be recorded by the printing mechanism and means for preventing restoring of the storage roll from its elevated position during an operation of the manipulative devices, said means being rendered ineffective when the manipulative devices are returned to their normal position.

5. In a machine of the class described, the combination with printing mechanism comprising side frames, of a storage roll, a storage roll frame attached to a printer side frame and movable relative thereto, a member carried by the printer side frame operable during an operation of the machine and normally allowing withdrawal of the storage roll frame, and means carried by the said member for preventing restoration of the storage roll frame to its normal position when said member is displaced from its normal position.

6. In a machine of the class described, the combination with printing mechanism, of paper feeding devices, a platen for effecting printing impressions, a storage roll, a storage roll frame carried by the printer side frame and movable relative thereto, a member carried by a printer side frame operable during a regular operation of the machine for actuating the platen and paper feeding devices, and means comprising a projection carried by the member normally ineffective to prevent movement of the storage roll frame, said means being rendered effective whenever the said member is displaced from its normal position.

7. In a machine of the class described, the combination with printing mechanism, of paper feeding devices, a platen for effecting printing impressions, a storage roll, a storage roll frame carried by the printer side frame and movable relative thereto, a member carried by a printer side frame operable during a regular operation of the machine for actuating the platen and paper feeding devices, means comprising an extension integral with said member normally ineffective to prevent restoration of the frame from its raised to its normal position, said means being rendered effective whenever said member is displaced from its normal position.

8. In an accounting machine, a printing mechanism comprising side frames, a second frame pivotally mounted on one of said side frames and movable relative thereto, item recording means, and means for locking said second frame against movement about its pivot after the item recording means begins to operate.

9. An article of manufacture comprising an impression pad of suitable composition, a metal holder for said pad, said holder being provided with a forward flange and a series of projections whereby the pad may be secured in said holder, and being further provided with a rearward extension whereby the article as a unit may be removably attached to an impression frame.

10. In a machine of the class described, the combination with a main operating mechanism, of printing mechanism comprising a support manually movable relative to the operating mechanism, a rotatably mounted storage roll, a feeding arm and pawl for the roll mounted on the support, normally connected devices for transmitting movements of the operating mechanism to the feeding arm and pawl, said devices being disconnected by movement of the movable support away from the operating mechanism, a normally ineffective lock for the feeding arm, and means for automatically rendering said lock effective when the aforesaid transmitting devices are disconnected.

11. In a machine of the class described, the combination with a main operating mechanism, of a support movable from and to a normal position relative to the operating mechanism, a storage roll and a feeding arm and pawl for the roll mounted on the movable support, devices normally connecting the feeding arm and pawl to the operating mechanism when the support is in normal position, said devices being disconnected when the support is moved away from said position, locking devices for the feeding arm and pawl, and means for rendering said devices effective or ineffective by the movements of the movable support.

12. In a cash register, the combination with a printing mechanism comprising side frames, of a frame movably mounted on and having a normal position relative to one of the printer side frames, a storage roll mounted on said movable frame, a feeding device for the storage roll carried by said movable frame, a stud secured to the feeding device, a device actuated at each operation of the machine and comprising a notch normally engaging the stud on the storage roll feeding device, said stud being disengaged from the notch when the movable frame is moved from normal position, and means for insuring engagement of the stud and notch when the movable frame is returned to its normal position.

13. In a machine of the class described, the combination with a main operating mechanism, of a bell crank moved at each operation of said mechanism, a support movable relative to the operating mechanism, a storage roll rotatably mounted on said support, a feeding arm and pawl for said roll mounted on the movable support, a normally effective connection between the feeding arm and the aforesaid bell crank, said arm and bell crank being disconnected by movement of the support in one direction, a lock for the feeding arm, and means for rendering said lock effective or ineffective by the movements of the aforesaid movable support.

14. In a machine of the class described, the combination with a main operating mechanism, of a bell crank provided with a notch in one of its arms and moved at each operation of the main operating mechanism, a supply roll receptacle, a frame movable relative to the bell crank to give access to the supply roll receptacle, a storage roll, a storage roll feeding device mounted on the movable frame, a stud on the feeding device normally engaged with the aforesaid notch in the bell crank, said stud being withdrawn from the notch when the frame is moved to gain access to the supply roll receptacle, a normally ineffective lock for the feeding device, and means for rendering said lock effective upon movement of the frame from its normal position.

15. In a machine of the class described, the combination with a main operating mechanism, of a printing apparatus comprising a manually movable support for certain parts of said apparatus, said support having a normal position in the apparatus, and means rendered effective at the beginning of an actuation of the main operating mechanism for preventing the manual movement of the support until the operation of the main operating mechanism is completed.

16. In a machine of the class described, the combination with a main operating mechanism, of a printing apparatus comprising a manually movable support for certain of the parts of said apparatus, said support having a normal position in the apparatus, a connection effective when the support is in said normal position for transmitting movement from the main operating mechanism to the parts on the movable support, said connection being rendered ineffective by movement of the support away from its normal position, a lock to prevent movement of said support and means controlled by the main operating mechanism for rendering said lock effective.

17. In a machine of the class described, the combination with a main operating mechanism having a normal starting point, of a printing apparatus comprising a manually movable support for certain parts of said apparatus, said support having a normal position in the apparatus, and means rendered effective at the beginning of an actuation of the main operating mechanism for preventing movement of the support away from or back to its normal position until the main operating mechanism has been restored to its normal starting point.

18. In a machine of the class described, the combination with a main operating mechanism having a normal starting point, of a printing mechanism comprising paper feeding devices and a manually movable support for said feeding devices, said support normally being in position for the main operating mechanism to actuate the feeding devices, a lock for the feeding mechanism rendered effective by movement of the movable support from its normal position, and means rendered effective by actuation of the main operating mechanism for preventing movement of the support away from or back to its normal position until the main operating mechanism has been returned to its normal starting point.

19. In a machine of the class described, the combination with a main operating mechanism, of a support manually movable from and to a normal position, relative to the operating mechanism, a storage roll and feeding arm and pawl for the roll mounted on the movable support, connections for transmitting movements of the operating mechanism to the feeding arm, said connections being effective when the support is in unmoved position and ineffective when the support is moved from said position, a lock for the feeding arm, means for operating the lock by moving the support away from its unmoved position, and means for preventing the movable support from being returned to its starting point if the operating mechanism is partially operated.

20. In a machine of the class described, the combination with a main operating mechanism, of a bell crank provided with a notch in one of its arms and connected for movement at each operation of the main operating mechanism, a supply roll receptacle, a frame movable relative to the bell crank from a closed to an open position to give access to the supply roll receptacle, a storage roll and a feeding device therefor mounted on the movable frame, a stud on the feeding device engaged with the aforesaid notch when the frame is in closed position, said stud being withdrawn from the notch when the frame is moved to open position, and co-operating means on the frame and the bell crank for preventing return of the frame to closed position when the main operating mechanism is in a partially operated condition.

21. In a machine of the class described, the combination with a main operating mechanism, of a bell crank provided with a notch in one of its arms and given a fixed movement at each operation of the main operating mechanism, a supply roll receptacle, a frame movable relative to the bell crank to give access to the supply roll receptacle, a storage roll feeding device mounted on the movable frame, a stud on the feeding device normally engaged with the aforesaid notch in the bell crank, said stud being withdrawn from the notch when the frame is moved to gain access to the supply roll receptacle, a normally ineffective lock for the feeding device, means for rendering said lock effective upon movement of the frame from its normal position, and means on the frame and bell crank co-operating to prevent returning the frame to normal position when the main operating mechanism is in a partially operated condition.

22. In a machine of the class described, the combination with type carriers and means for operating them to set different type at a printing line, of an impression block, and a holder for said block, a support mounted adjacent the type carriers and comprising means co-operating with the impression block and holder for detachably retaining the holder and block with the block in printing relation with the printing line of type, and means for effecting relative movements of the type carriers and said support whereby to cause printing engagement of the type and impression block.

23. In a machine of the class described, the combination with type carriers and means for operating them to set different type at a printing line, of an impression block, a plate to which said block is attached, a support mounted adjacent the type carriers and comprising a slot to receive the impression block plate and detachably hold the same with the impression block in alignment with the printing line of type, and means for effecting relative movements of the type carriers and said support whereby to cause printing engagement of the type and impression block.

24. In a machine of the class described, the combination with type carriers and means for adjusting them to set different type thereon at a printing line, of an impression block and a plate to which said block is attached, a support mounted adjacent the printing line of type, said support being cut away to receive the impression block and its plate, a second plate attached to and co-operating with the support to receive and hold the impression block and its mounting plate in position in the cut away portions of the support, and means for effecting relative movements of the type carriers and said support whereby to cause printing engagement of the type and impression block.

25. In a machine of the class described, the combination with type carriers and means for adjusting them to set different type thereon at a printing line, of an impression block and a plate to which said block is attached, a support mounted adjacent the type carriers, said support being cut away to receive the impression block and its mounting plate, a second plate attached to the support, said second plate being constructed to form a writing table and co-operating with the support to receive and hold the impression block and its mounting plate in the cut away portion of the support, and means for effecting relative movements of the type carriers and said support whereby to cause printing engagement of the type and impression block.

26. In a machine of the class described, the combination with type carriers, of a support mounted adjacent the type carriers and having upper and lower faces converging at an acute angle toward an edge on the support, an impression block and holder therefor removably mounted in the support, said holder being so constructed that a portion thereof forms, when in position in the support, a part of said edge on the support, means for effecting relative movements of the type carriers and said support whereby to cause the type carriers and impression block to print upon a record strip, means for feeding the record strip to carry the successive impressions over the edge of the support to a position above the upper face of the support, and a machine casing having a writing opening through which notations may be made on a portion of the record strip after the strip is fed.

27. In a machine of the class described, the combination with a casing having a writing opening, of type carriers, a support movably mounted adjacent the type carriers and having upper and lower faces converging toward and merging in a rounded edge on the support, the upper of said faces providing a writing surface adjacent the writing opening in the casing, an impression block and carrying plate therefor removably mounted in the support, said plate and impression block being so constructed that a portion thereof forms, when in position in the support, a part of the rounded edge of the support, means for effecting movements of said support to cause the impression block and type carriers to make impressions on a record strip, and means for feeding the record strip to carry the successive impressions over the rounded edge of the support to a position adjacent the writing opening in the casing.

28. In a machine of the class described, the combination with type carriers, of impression taking devices comprising a platen support a stationary receptacle in which a supply roll of record strip may be deposited, a paper guide plate formed as a part of the receptacle and extending to a point adjacent the impression taking devices, a writing table mounted adjacent the impression taking devices, a record strip storage roll, the record strip passing from the supply roll in the receptacle, over the guide plate, between the impression taking devices and the type carriers, across the writing table and thence to the storage roll, means for actuating the impression taking devices during operations of the machine, and means for imparting a step of feeding movement to the storage roll after each operation of the impression taking devices.

29. As an article of manufacture an impression block comprising a metal frame provided with a flange and a series of lugs, an impression pad secured between said flange and said lugs and means carried by said frame for attaching the unit substantially as set forth.

30. In a machine of the class described, an impression frame, and an impression block adapted to be detachably secured in said frame, said block comprising a holder provided with a flange, a series of lugs and an extension for securing said holder to the impression frame, and an impression pad secured between said flange and said lugs.

31. In a machine of the class described, a main operating mechanism, a printing mechanism comprising a printer frame, a record strip support movably mounted on said frame, means on said support for feeding and storing a record strip, severable connections from said operating mechanism to said storing means for feeding the record strip, and means for locking said strip feeding means when the connection is severed.

32. In a machine of the class described, a main operating mechanism, printing mechanism comprising a printer frame, a record strip support movably mounted on said frame, means on said support for feeding and storing a record strip, severable connections from said operating mechanism to said storing means for feeding the record strip, means for locking said strip feeding means when the connection is severed and means for preventing said connection from being severed during an operation of the operating mechanism.

33. In a machine of the class described, an operating mechanism, a movable record frame, strip feeding means thereon, connections from said operating mechanism to said strip feeding means comprising an arm movable about a relatively fixed pivot and a member carried by said frame, said arm and member being provided with normally interengaging means, said interengaging means being separated upon movement of the frame, and interlocking means preventing return of said frame if either of said interengaging means is shifted from normal.

34. In a machine of the class described, an operating mechanism, a movable record frame, strip feeding means thereon, connections from said operating mechanism to said strip feeding means comprising an arm movable about a relatively fixed pivot and a member carried by said frame, said arm and member being provided with normally interengaging means, said interengaging means being separated upon movement of the frame, interlocking means preventing return of said frame if either of said interengaging means is shifted from normal and means on said member for holding said frame in moved position until released.

35. In a machine of the class described, an enclosing casing provided with an aperture, a transparent plate in said aperture and covering all but a small portion thereof, constituting a writing opening, a platen member located under said writing opening, said member having a relatively sharp smooth edge around which a record medium may be passed, printing elements located under said platen and arranged to print on a portion of the record medium not in alinement with the writing opening, means for effecting printing of an entry from said elements and means for then advancing the record strip to present a new line at the printing point, whereby the entry formed is shifted around the sharp edge of the platen to a point adjacent to and in line with the writing opening.

36. In a machine of the class described, the combination of a casing, an opening therein, a plate of transparent material in said opening and adapted to cover all of said opening, except a small portion forming a writing opening, a record strip supporting platen located under said writing opening and adapted to expose a portion of the record strip at said opening, printing elements located under said platen and arranged to print on a portion of the strip not in alignment with the writing opening, means for effecting printing of an entry from said elements and means for then advancing the record strip so that the entry so formed is moved from its position under the platen around the end thereof to a position on the upper side of the platen, said last mentioned position being adjacent to and to the side of said writing opening so that a notation may be made through said opening readable along the same line as said printed entry.

37. In a machine of the class described, the combination of a casing, an opening therein, a plate of transparent material in said opening and adapted to cover all of said opening, except a small portion forming a writing opening, a record strip supporting platen located under said writing opening and adapted to expose a portion of the record strip at said opening, printing elements located under said platen and arranged to print on a portion of the strip normally on the underside of the platen, means for effecting printing of an entry from said elements and means for then advancing the record strip so that the entry so formed is moved from its position under the platen around the end thereof to a position on the upper side of the platen under the transparent material and adjacent to the writing opening.

38. In a machine of the class described, the combination of a casing, an opening therein, a plate of transparent material in said opening and adapted to cover all of said opening except a small portion forming a writing opening, a record strip supporting platen located under said writing opening and adapted to expose a portion of the record strip at said opening, printing elements located under said platen and arranged to print on a portion of the strip normally on the underside of the platen, means for effecting printing of an entry from said elements and means for then advancing the record strip so that the entry so formed is moved from its position under the platen around the end thereof to a position on the upper side of the platen.

39. In a machine of the class described, the combination of a casing, an opening therein, a plate of transparent material in said opening and adapted to cover all of said opening except a small portion forming a writing opening, a record strip supporting platen located under said writing opening and adapted to expose a portion of the record strip at said opening, printing elements located under said platen and arranged to print on a part of the strip normally located beneath the platen, means for effecting printing of an entry from said elements and means for then advancing the record strip so that the entry so formed is moved from its position under the platen around the end thereof to a position on the upper side of the platen.

40. In a machine of the class described, an enclosing casing provided with an aperture, a transparent plate in said aperture and covering all but a small portion thereof, constituting a writing opening, a platen member located under said writing opening, said member having a relatively sharp smooth edge around which a record medium may be passed, printing elements located under said platen and arranged to print on a portion of the record medium not in alinement with the writing opening, means for effecting printing of an entry from said elements and means for then advancing the record strip to present a new line at the printing point, whereby the entry formed is shifted around the sharp edge of the platen to a point adjacent to and to the side of the writing opening so that a notation may be made through said opening readable along the same line as said printed entry.

41. In a machine of the class described, the combination with a main operating mechanism, of a printing apparatus comprising a support for a portion of said apparatus, said support having a normal position in the apparatus and being manually movable to a position wherein certain parts of said apparatus are out of operative relation to each other, and means rendered effective at the beginning of an actuation of the main operating mechanism for preventing the manual movement of the support until the operation of the main operating mechanism is completed.

42. In a machine of the class described, the combination of a casing, an opening therein, a plate of transparent material in said opening and adapted to cover all of said opening except a small portion forming said opening, a platen located under a writing opening adapted to cooperate said writing opening with a record strip and to expose a portion of said record strip at said opening, printing elements located under said platen and arranged to print on a portion of said record strip, means for effecting printing of an entry from said elements, and means for shifting the record strip to bring the printed entry adjacent the writing opening and simultaneously bringing into printing relation with said platen the portion of said record strip that is to receive the next printed entry.

43. In a machine of the class described, the combination of a casing, an opening therein, a plate of transparent material in said opening and adapted to cover all of said opening except a small portion forming a writing opening, a platen located under said writing opening adapted to cooperate with a record strip and to expose a portion of said record strip at said opening, printing elements located under said platen and arranged to print on a portion of said record strip, means for effecting printing of an entry from said elements, and means whereby the record strip may by a single unidirectional movement be advanced to bring the printed entry from its position under the platen around the end thereof to a position on the upper side of the platen and to bring beneath said platen the portion of said record strip that is to receive the next entry.

In witness whereof I have signed my name hereto this 27th day of March, 1923.

CHARLES A. THISTLETHWAITE.